US012254589B2

(12) United States Patent
Karimi Dastjerdi et al.

(10) Patent No.: US 12,254,589 B2
(45) Date of Patent: Mar. 18, 2025

(54) EXTRAPOLATING PANORAMAS FROM IMAGES USING A GENERATIVE MODEL

(71) Applicant: Adobe Inc., San Jose, CA (US)

(72) Inventors: Mohammad Reza Karimi Dastjerdi, Quebec (CA); Yannick Hold-Geoffroy, San Jose, CA (US); Vladimir Kim, Seattle, WA (US); Jonathan Eisenmann, San Francisco, CA (US); Jean-François Lalonde, Quebec (CA)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 18/055,716

(22) Filed: Nov. 15, 2022

(65) Prior Publication Data

US 2023/0360170 A1   Nov. 9, 2023

Related U.S. Application Data

(60) Provisional application No. 63/326,661, filed on Apr. 1, 2022.

(51) Int. Cl.
| | |
|---|---|
| *G06T 3/04* | (2024.01) |
| *G06T 3/18* | (2024.01) |
| *G06T 3/4023* | (2024.01) |
| *G06T 3/4046* | (2024.01) |
| *G06T 7/00* | (2017.01) |
| *G06V 10/774* | (2022.01) |
| *G06V 10/776* | (2022.01) |

(52) U.S. Cl.
CPC ............ *G06T 3/4023* (2013.01); *G06T 3/04* (2024.01); *G06T 3/18* (2024.01); *G06T 3/4046* (2013.01); *G06T 7/0002* (2013.01); *G06V 10/774* (2022.01); *G06V 10/776* (2022.01); *G06T 2207/20081* (2013.01); *G06T 2207/20084* (2013.01); *G06T 2207/30168* (2013.01)

(58) Field of Classification Search
CPC . G06T 2207/20081; G06T 2207/30168; G06T 3/04; G06T 3/18; G06T 3/4046; G06T 7/0002; G06V 10/774; G06V 10/776
See application file for complete search history.

(56) References Cited

U.S. PATENT DOCUMENTS 10,607,329 B2 *   3/2020   Sunkavalli ............. G06N 3/047

OTHER PUBLICATIONS

Xiao et al., "Recognizing scene viewpoint using panoramic place representation," in Computer Vision and Pattern Recognition, Jun. 2012, pp. 2695-2702. (Year: 2012).*

(Continued)

*Primary Examiner* — Sing-Wai Wu
(74) *Attorney, Agent, or Firm* — Nicholson De Vos Webster & Elliott LLP

(57) ABSTRACT

Embodiments are disclosed for generating 360-degree panoramas from input narrow field of view images. A method of generating 360-degree panoramas may include obtaining an input image and guide, generating a panoramic projection of the input image, and generating, by a panorama generator, a 360-degree panorama based on the panoramic projection and the guide, wherein the panorama generator is a guided co-modulation generator network trained to generate a 360-degree panorama from the input image based on the guide.

18 Claims, 14 Drawing Sheets

(56) References Cited

OTHER PUBLICATIONS

Karimi Dastjerdi et al., "Guided Co-Modulated GAN for 360 Field of View Extrapolation", 2022 International Conference on 3D Vision (3DV), Sep. 12-16, 2022, p. 475-485. (Year: 2022).*

Akimoto et al., "360-Degree Image Completion by Two-Stage Conditional Gans," 2019 IEEE International Conference on Image Processing (ICIP), Aug. 2019, pp. 4704-4708.

Chong et al., "Effectively Unbiased FID and Inception Score and Where to Find Them," 2020 IEEE/CVF Conference on Computer Vision and Pattern Recognition (CVPR), 2019, pp. 6069-6078.

Fernandez-Labrador et al., "Corners for Layout: End-to-End Layout Recovery From 360 Images," IEEE Robotics and Automation Letters, Mar. 5, 2019, pp. 1255-1262, arXiv:1903.08094v2 [cs.CV].

Hara, T., et al., "Spherical Image Generation from a Single Image by Considering Scene Symmetry," Proceedings of the AAAI Conference on Artificial Intelligence, 35(2), May 2021, pp. 1513-1521.

Hartley et al., "Multiple View Geometry in Computer Vision", Second Edition, Cambridge University Press, Mar. 2004, 673 pages.

He et al., "Deep Residual Learning for Image Recognition," Proceedings of the 2016 IEEE Conference on Computer Vision and Pattern Recognition (CVPR), Jun. 2016, pp. 770-778.

Hold-Geoffroy et al., "A Perceptual Measure for Deep Single Image Camera Calibration," CVPR 2018, pp. 2354-2363.

Legendre, C., et al., "DeepLight: Learning Illumination for Unconstrained Mobile Mixed Reality," Proceedings of the IEEE/CVF Conference on Computer Vision and Pattern Recognition (2019), pp. 5918-5928.

Somanath, G. et al., "HDR Environment Map Estimation for Real-Time Augmented Reality," Proceedings of the IEEE/CVF Conference on Computer Vision and Pattern Recognition (CVPR), Jun. 2021, pp. 11298-11306.

Wang et al., "High-Resolution Image Synthesis and Semantic Manipulation with Conditional GANs", CVPR, 2018, pp. 8798-8807.

Xian et al. "UprightNet: Geometry-Aware Camera Orientation Estimation From Single Images," 2019 IEEE/CVF International Conference on Computer Vision (ICCV), 2019, pp. 9973-9982.

Zhao et al., "Large Scale Image Completion via Co-Modulated Generative Adversarial Networks," ICLR 2021, Mar. 2021, pp. 1-25.

Zhou et al., "Places: a 10 Million Image Database for Scene Recognition," IEEE Transactions on Pattern Analysis and Machine Intelligence, vol. 40, No. 6, Jun. 2018, pp. 1452-1464.

* cited by examiner

EXTRAPOLATING PANORAMAS FROM IMAGES USING A GENERATIVE MODEL

BACKGROUND

Photographs show a glimpse of reality captured when the shutter is pressed: they are but a window on a moment frozen in time. Yet, despite the limits of cameras, one can easily imagine the scene in which the image was captured by picturing the contents surrounding the photograph: surely it was a large tree that was casting this shadow on the lawn, and there were undoubtedly other vehicles and pedestrians passing by this busy street. In computer vision, extrapolating such plausible content outside the frame boundaries is known as image out-painting.

While image synthesis methods have long been used as a solution to this problem, more recently learning-based methods which leverage learned priors for this task have been shown to yield more promising results. For example, methods have been trained to generate images that would likely arise if one were to continuously pan (i.e., translate) the camera.

SUMMARY

Introduced here are techniques/technologies that generate a full 360-degree panorama image from an input narrow field of view image. Embodiments use a guided co-modulation generator network to enable users to control the panorama generation process. For example, a pretrained guide model may support various classes of scenes. The user can select one of these classes as a guide which is then used by the guided co-modulation generator network when generating the panorama. As such, rather than a randomly predicted panorama, the panorama generation system generates a varied set of results consistent with the input image and semantically matching the desired class.

More specifically, in one or more embodiments, camera parameters are estimated for an input image to generate a panoramic projection. For example, the input image may be warped based on the camera parameters to form part of an equirectangular representation of the panorama. This panoramic projection is then provided to a generator model which generates a full 360-degree panorama using the image and a guided user input. A neural network is trained to generate the panoramic projection to have matching edges, this results in no discontinuities across the full 360-degree panorama.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
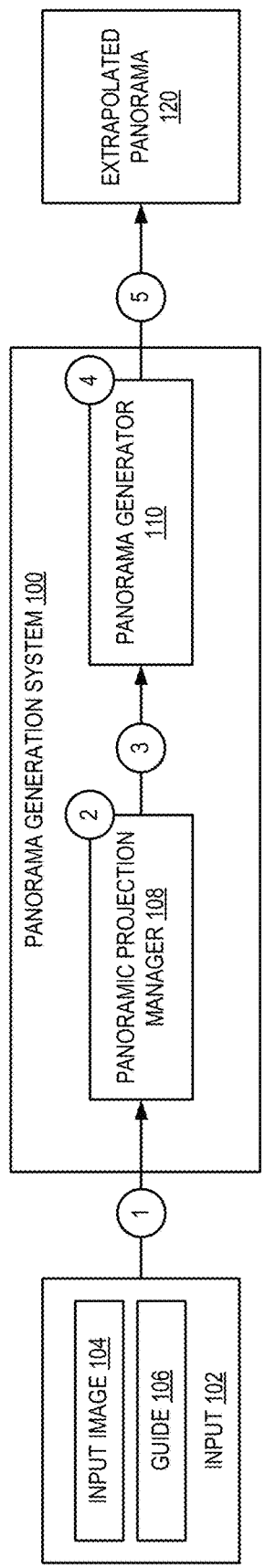
FIG. 1 illustrates a diagram of a process of extracting 360-degree panoramas from narrow field of view images in accordance with one or more embodiments.

One or more embodiments of the present disclosure include a panorama generation system which generates an entire 360-degree view around the camera based on an input image. This effectively extrapolates the field of view of the camera to span an entire sphere formed by rotating the camera around its center of projection. Virtual object insertion is a complex, but critical component, of 3D composition and augmented reality. In particular, it is especially challenging to insert virtual objects in a visually pleasing way, especially if the objects are shiny or reflective. This is because, to be realistic to a viewer, a shiny or reflective object needs to reflect the environment around the camera. However, a typical image of a scene captures only a small fraction of the environment of that scene.

When a photograph is taken, typically the only information about the overall environment that is captured is the image itself. Accordingly, to fill in this missing data, advanced techniques are required to hallucinate the entire lighting environment from a given image. This means that an infinite number of predicted environment maps may be generated from any given image. Prior techniques have used autoencoder architectures to perform environment map extraction. Some of these techniques may, for example, estimate direction lighting, ambient low-frequency spherical harmonics, and an HDR cubemap. However, this technique typically produces low resolution results. Other techniques require the user to scan the environment (thereby capturing additional environmental data) to be used. Still other techniques assume that the environment mirrors the image, and then fills in holes as needed using a generative adversarial network (GAN) or patch-based algorithm. This can result in artifacts near boundaries of the input image as well as visually confusing images when looking at a glossy or transparent object, where objects are duplicated and visible in front of, and behind, the camera in the environment map.

To address these and other deficiencies in conventional systems, embodiments include a panorama generation system to extrapolate a 360-degree panorama from a narrow field of view input image. An improved GAN architecture and training techniques are used to convert an unconditional GAN into a conditional image generator. This allows for high resolution and improved quality panoramas to be generated from an input image, as compared to previous techniques. Additionally, the GAN is conditioned on the input image and executed in a single feed-forward pass, making it much faster to execute and more accurate than traditional methods.

In some embodiments, camera parameters are estimated for the input image to generate a panoramic projection. This panoramic projection is then provided to a generator model which generates a full 360-degree panorama using the image and a guided user input. A neural network is trained to generate the panoramic projection to have matching edges, this results in no discontinuities across the full 360-degree panorama.

FIG. 1 illustrates a diagram of a process of extracting 360-degree panoramas from narrow field of view images in accordance with one or more embodiments. As shown in FIG. 1, a panorama generation system 100 receives an input 102 which comprises an input image 104 and a guide 106, at numeral 1. The input image can include any image capturing less than a full 360-degree panorama. The term "image" or "digital image" refers to a digital graphics file that when rendered displays one or more objects. In particular, the term "image" comprises a digital file that, when rendered, includes visual representations of one or more objects, such as a person. For example, the term "digital image" includes, but is not limited to, digital files with the following file extensions: JPG, TIFF, BMP, PNG, RAW, or PDF. The guide 106 includes a label that is used by the panorama generation system 100 to influence the panorama that is generated for the input image. For example, a guide of 'sky' generates a panorama that emphasizes the sky, a guide of 'lawn' adds grass to the generated panorama, etc.

At numeral 2, a panoramic projection manager 108 generates a panoramic projection of the image. In some embodiments, the panoramic projection manager 108 includes a machine learning model, such as a neural network, which has been trained to estimate camera parameters based on the input image and warp the input image into a panoramic projection. For example, the input image is warped to an equirectangular representation based on a simplified camera model using the estimated camera parameters. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 3, the panoramic projection is provided to panorama generator 110. Panorama generator 110 may include a machine learning model trained to generate a 360-degree panorama from an input panoramic projection. In some embodiments, the panorama generator 110 is a generator model trained as part of a generative adversarial network (GAN). Examples of GANs include StyleGAN, CoModGAN, etc. Embodiments build on CoModGAN by enabling guided co-modulation. In particular, embodiments replace the random masks of CoModGAN with field of view (FOV) masks. Additionally, embodiments add a horizontal shift to the generator output during training before providing the generated image to the discriminator model. This trains the generator to generate panoramas that do not have discontinuities at the edges. Additionally, the architecture is modified to yield a 2:1 aspect ratio to avoid anisotropic upsampling artifacts when mapping the output to the equirectangular representation.

At numeral 4, the panorama generator generates an extrapolated panorama from the input image and the guide. The resulting extrapolated panorama 120 is then output at numeral 5. The extrapolated panorama may be used in variety of applications. For example, in virtual object compositing an object is added to an image. When the object has a shiny or otherwise reflective surface, one would expect it to reflect portions of the environment in which the image was captured. However, when presented with an image, there is no data available for what the surroundings may plausibly look like. By first extrapolating a panorama from the input image, the resulting extrapolated panorama is used to add reflections to the composited objects, resulting in a more realistic and visually pleasing scene.

Figure 2:
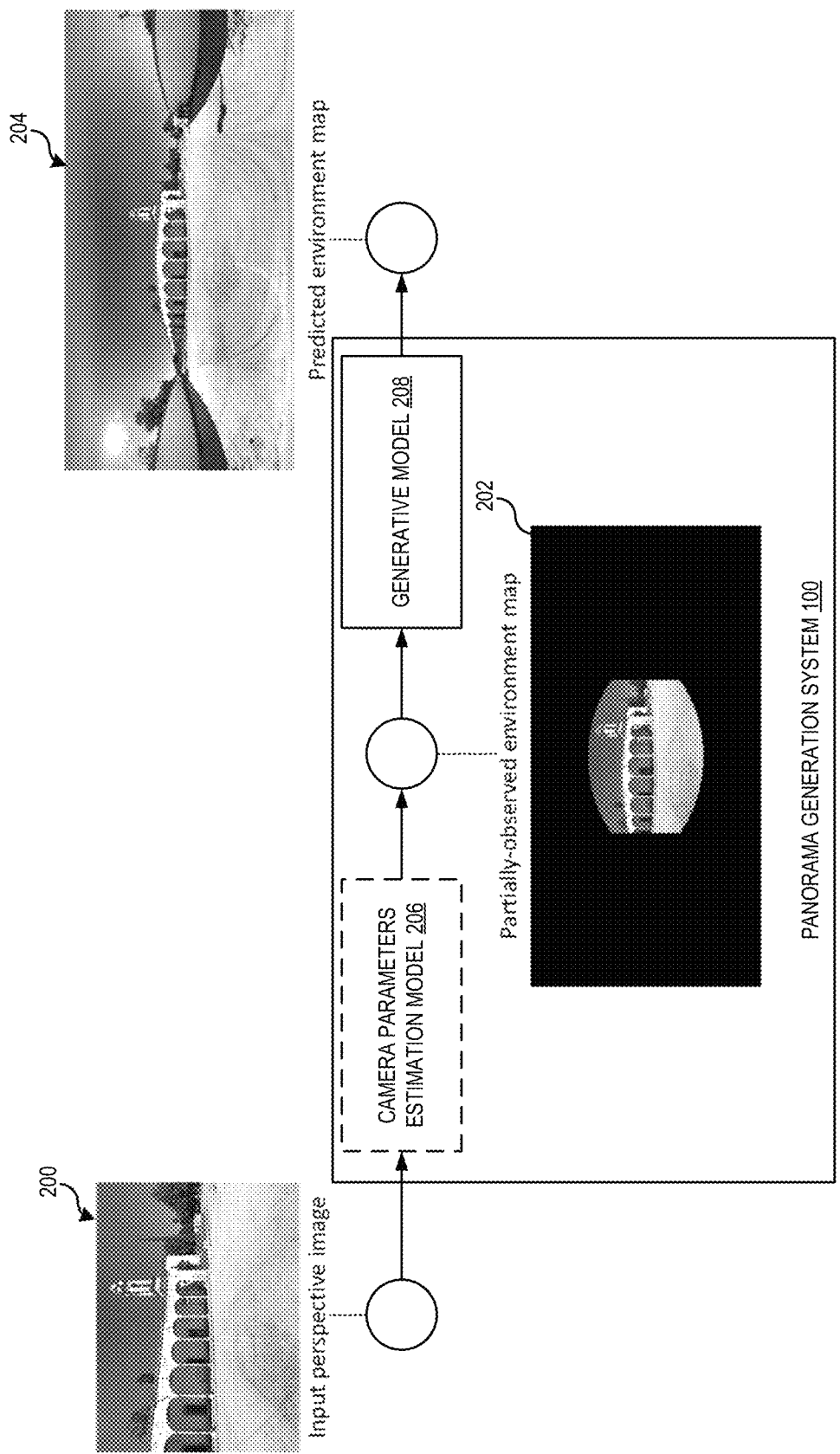
FIG. 2 illustrates a diagram of a pipeline extracting 360-degree panoramas from narrow field of view images in accordance with one or more embodiments.

FIG. 2 illustrates a diagram of a pipeline extracting 360-degree panoramas from narrow field of view images in accordance with one or more embodiments. As shown in FIG. 2, an input image 200 is provided to panorama generation system 100. In this example, the input image depicts a building, parking lot, trees and sky. The panorama generation system then generates a panoramic projection 202 of the input image. As shown, the panoramic projection 202 has been warped based on estimated camera parameters. In some embodiments, the camera parameters are inferred using a camera parameter estimation model 206. Alternatively, different techniques may be used to generate the panoramic projections 202 and/or obtain the camera parameters. For example, in some embodiments, the camera parameters may be known (e.g., based on a known camera model, included as metadata with the input image, etc.). The panoramic projection 202 then serves as input to the panorama generator (e.g., generative model 208 as shown) which then generates a panorama 204 from the panoramic projection. As shown, this generates a full 360-degree panorama.

Figure 3:
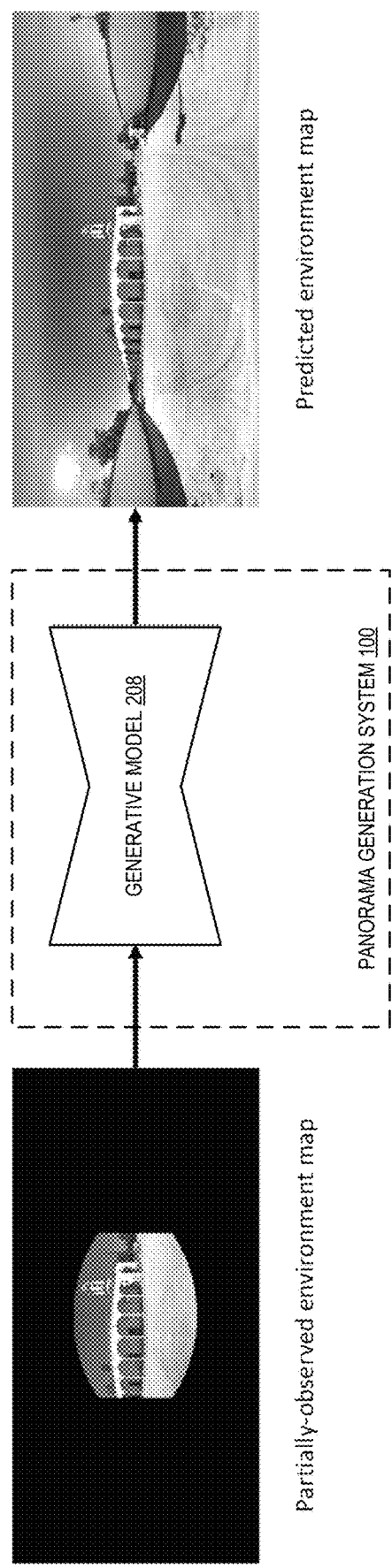
FIG. 3 illustrates a diagram of generating a 360-degree panorama from narrow field of view image for in accordance with one or more embodiments.

FIG. 3 illustrates a diagram of generating a 360-degree panorama from narrow field of view image for in accordance with one or more embodiments. As shown in FIG. 3, in some embodiments, the panorama generation system 100 includes the panorama generator but does not include components for generating the panoramic projection. The panoramic projection may be obtained from a separate system or service, generated by the user, etc.

Figure 4:
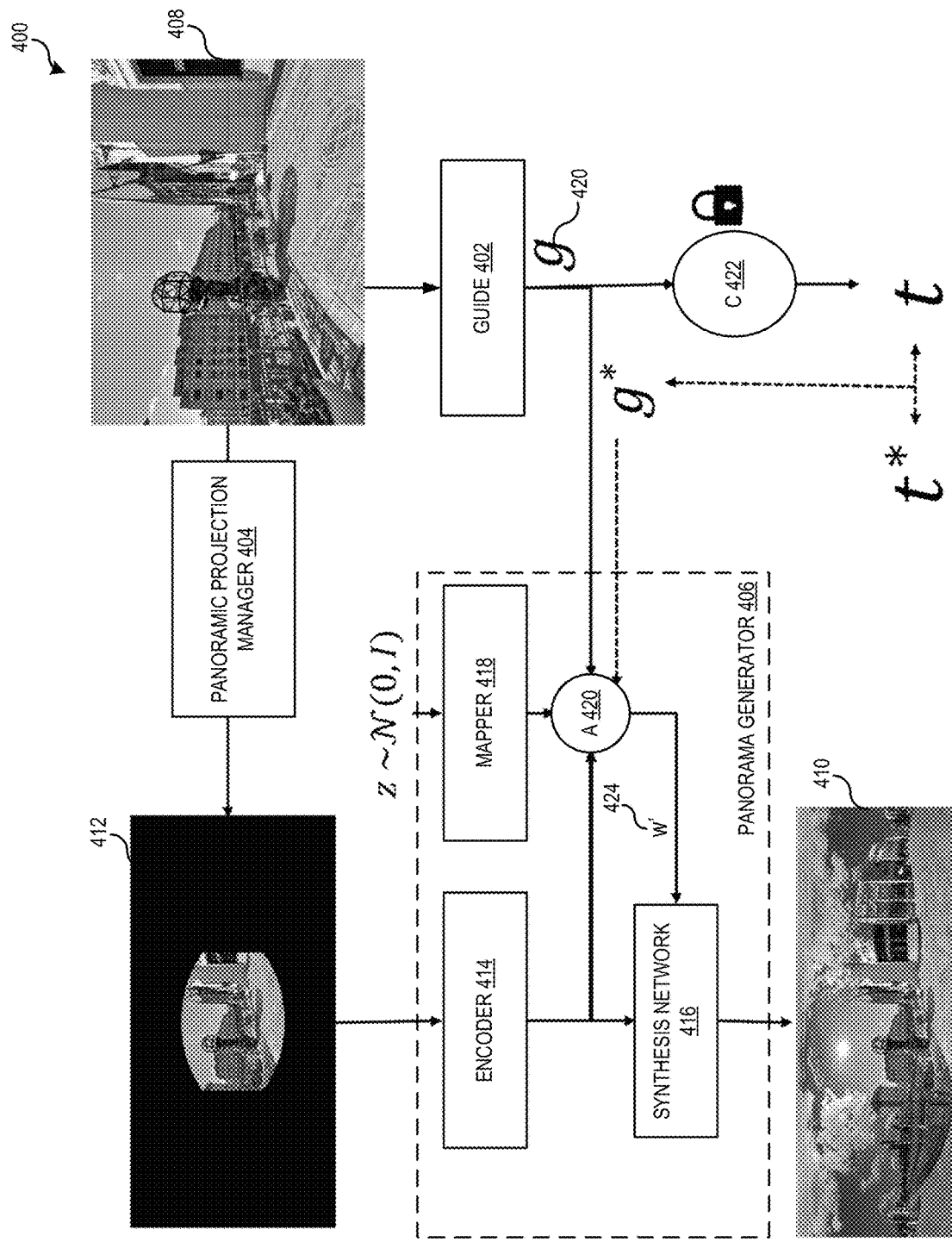
FIG. 4 illustrates a diagram of a model architecture for extracting 360-degree panoramas from narrow field of view images for in accordance with one or more embodiments.

FIG. 4 illustrates a diagram of an architecture of a panorama generation system for extracting 360-degree panoramas from narrow field of view images for in accordance with one or more embodiments. As shown in FIG. 4, architecture 400 includes a guide model 402, a panoramic projection manager 404, and panorama generator 406. As discussed, the panorama generation system receives an input image 408 which has a less than 360-degree field of view, and outputs a 360-degree panorama 410.

As discussed, the input image 408 is provided to panoramic projection manager 404 to generate panoramic projection 412. As discussed, embodiments extrapolate a 360-degree field of view from an input image. This can be framed as an out-painting in an equirectangular panoramic representation. As a first step, the input image 408 is warped into an equirectangular representation 412:

$$p_{im} = KRp_w$$

Here, $p_w$ represents a 3D point in world coordinates (whose origin coincides with the center of projection of the camera, hence no translation), and $p_{im}$ represents its projection in homogeneous coordinates on the image plane. A pinhole camera model with common assumptions (e.g., principal point is the image center, negligible image skew, unit pixel aspect ratio, etc.), can be used to yield K=diag ([f f 1]), where f is the focal length in pixels. In some embodiments, in the representation f is replaced with the vertical field of view $$h_\theta = 2\arctan\left(\frac{h}{2f}\right),$$

where h is the image height.

The rotation matrix R can be parameterized by roll, $\gamma$, pitch $\beta$, and yaw $\alpha$. Since an arbitrary image possesses no natural reference frame to estimate $\alpha$, it is set to 0, and $\gamma$ is also set to 0. This results in R=$R_x(\beta)$. In some embodiments, camera parameters f and $\beta$ are assumed to be known. Alternatively, the camera parameters may be inferred or estimated from the input image, such as using a camera parameter estimation model, as discussed above.

As shown in FIG. 4, panorama generator 406 provides a co-modulated GAN, such as the CoModGAN architecture. A co-modulated GAN receives a warped input image and then an encoder 414 co-modulates synthesis network 416 with mapper 418 based on the warped input image 412. Such a co-modulated GAN architecture alone produces high quality results for image completion but is not suitable for full panorama extrapolation. For example, random masks are used during training which do not represent the typical scenarios of FOV extrapolation. This results in blurry results at test time. Additionally, since such networks are designed for inpainting in perspective images, distinct artifacts are produced along the edge of the panorama (e.g., where the image "wraps-around"). These shortcomings are addressed below via a number of improved training techniques.

Additionally, as discussed, prior techniques can predict an infinite number of environment maps, making it difficult to identify appropriate maps for any given application. This lack of control over output presents a major challenge to implementing such systems. Accordingly, embodiments use another, pre-trained network, in concert with the GAN as a guide for co-modulation. The guide model 402 is a trained model that predicts a class associated with the input image. The class describes the characteristics of the image, such as picnic area, sky, cliff, street, lawn, etc. Various classification models may be used as guide model 402. The guide model produces a latent vector g 420 from the input image 408.

In some embodiments, the latent vector g 420 that corresponds to the class which is provided to the panorama generator 406. If the user provides a different input guide, then a difference between the determined target class t of the input image and the user-selected class, represented as t*, is calculated and passed back through the guide model 402 to determine the corresponding latent vector g* (e.g., a target vector) which is then provided to the panorama generator 406. In some embodiments, both g and g* are provided to the panorama generator. In some embodiments, only g or g* is provided. This latent vector g 420 is then provided to a classification subnetwork 422 $t$=c (g). Here t$\in \mathbb{R}^N$ is the vector of predicted probabilities over N classes. The guided co-modulated vector w' 424 is $$w'=A(\mathcal{G}(x), \mathcal{M}(z))$$

In the above equation, $\mathcal{G}(x)$ is the output of the guided model applied to the input image, x, $\mathcal{M}(z)$ is the output of mapper 418 applied to input z, and A is a learnable affine transformer that combines the output of the encoder, the mapper, and the guide network. The guided co-modulated output and the output of the encoder 414 is then provided to the synthesis network 416 of panorama generator 406 which generates the full 360-degree panorama 410.

Embodiments can tune the output appearance of the output panorama 410 by modifying the latent vector g to represent another class. This can be done by optimizing a one-hot vector $\hat{t}$ with the desired class $$g^* = \underset{g}{\mathrm{argmin}}\, \ell(c(g), \hat{t})$$

where $\ell$ is a binary cross-entropy loss function. A panorama, whose appearance outside the FOV of the input image should better match t is produced by replacing g←g*, i.e., $$w'=A(g^*, \mathcal{M}(z))$$

In contrast to existing editing methods, embodiments do not require training the guide model on the domain output by the synthesizer (panoramas), any model pre-trained on regular images can do. It also does not require any analysis of the learned latent space.

Figure 5:
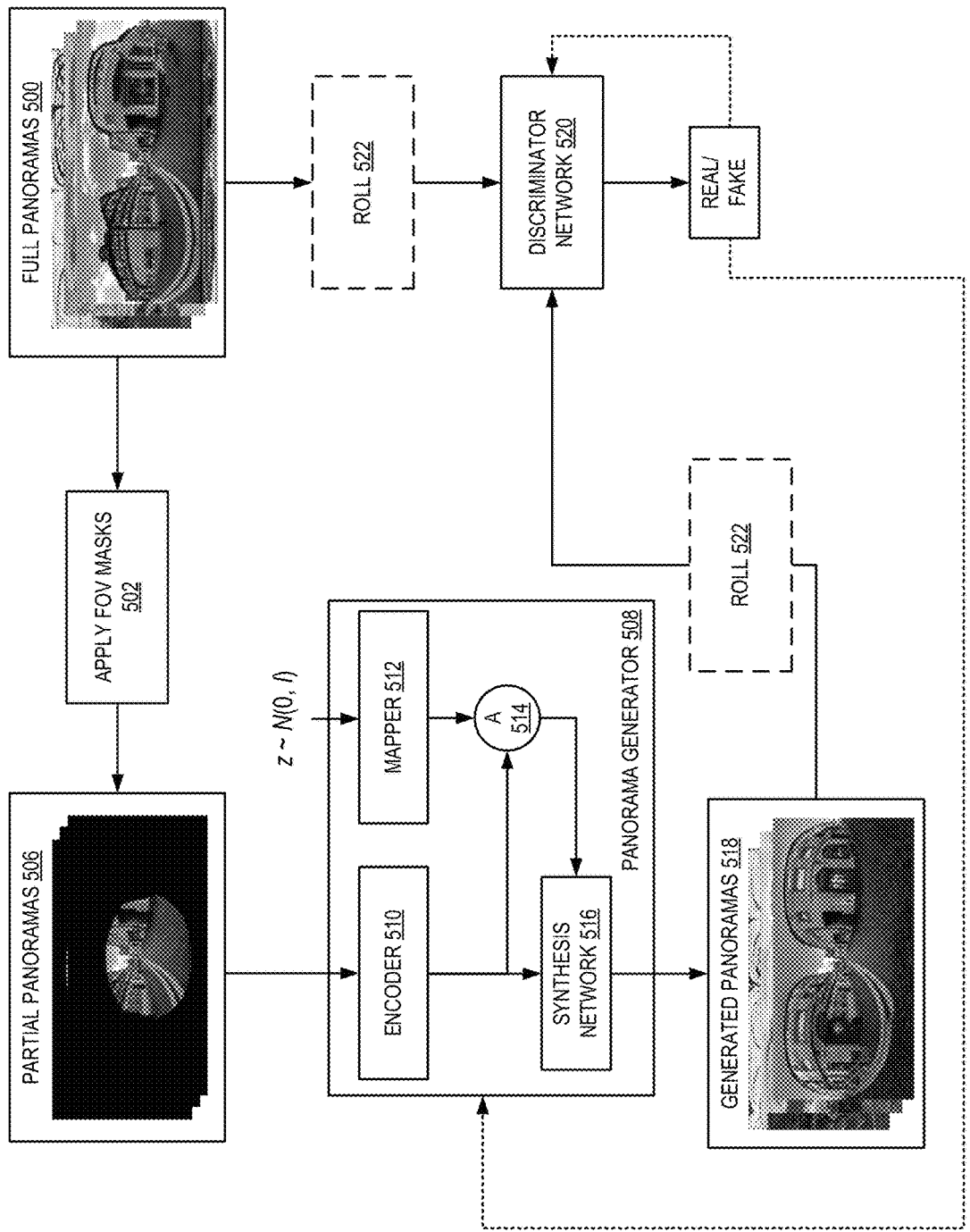
FIG. 5 illustrates a diagram of a system for training a model to generate 360-degree panoramas from narrow field of view images for in accordance with one or more embodiments.

FIG. 5 illustrates a diagram of a system for training a model to generate 360-degree panoramas from narrow field of view images for in accordance with one or more embodiments. Training the panorama generator starts with obtaining a training dataset that includes a plurality of full panorama images 500. The full panorama images may be obtained from any available source of 360-degree panoramas and do not need to be labeled. When training (and for validation), random crops are computed on the fly to ensure as diverse a set as possible. For example, in some embodiments, the parameters are sampled as $h_\theta$~U(40,120) for the FOV and $\beta$~N(0,30) for the elevation angle, where U and N are uniform and normal distributions respectively. After sampling, $\beta$ is clipped to [−30,30]'. A testing set of panoramas may be balanced between outdoor and indoor scenes that are not used during the training.

As shown in FIG. 5, from the full panoramas 500, various FOV masks corresponding to different camera parameters, elevations, etc. are applied 502 to obtain partial panoramas 506. Instead of the random masking of prior techniques, this results in a set of training images similar to what will be obtained at test time from an input image. These images are then provided to panorama generator 508, which includes an encoder 510, a mapper 512, a learnable affine transform 514 and a synthesis network 516. Once trained, the panorama generator 508 results in the panorama generators described above.

The output of the panorama generator 508 is generated panoramas 518. During training these are provided to a discriminator network 520 which compares the generated images to the full panoramas 500 and determines whether the generated image is real or fake. Based on the result, the discriminator network 520 and panorama generator 508 are then trained. As discussed, traditional training techniques lead to visual artifacts where the panorama wraps around on itself. To address this issue, at least some of the full panoramas are rolled 522 before being provided to the discriminator network. This roll represents a horizontal shift of the panorama and encourages the generator to learn to produce panoramas with no discontinuities at the edges. In some embodiments, the roll operator 522 is additionally, or alternatively, applied to the output of the panorama generator before being provided to the discriminator.

Figure 6:
FIG. 6 illustrates example field of view masks in accordance with one or more embodiments.
Figure 6:
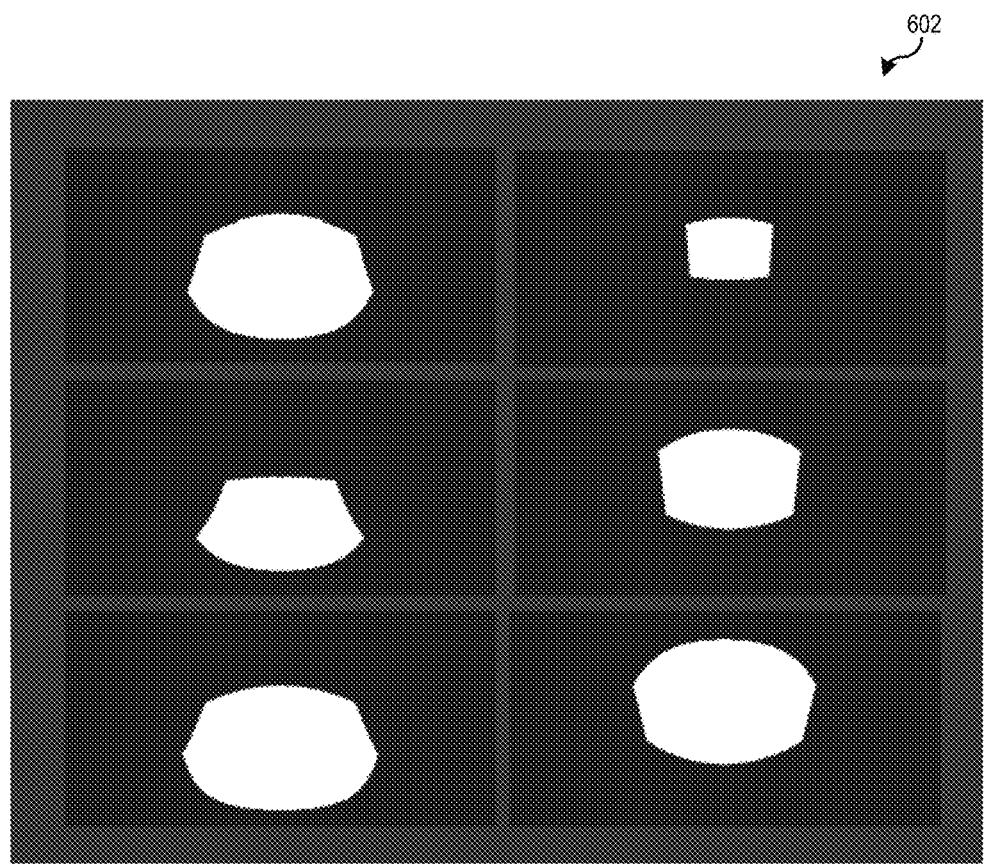

FIG. 6 illustrates example field of view masks in accordance with one or more embodiments. As discussed, prior co-modulated GANs were trained using random masks. An example of such random masks is shown at 600. These masks would be applied to images to create training images that were randomly masked. This would lead to training a generator that has learned to in-paint a plausible missing content under a wide variety of circumstances.

However, such training does not resemble the problem of in-painting panoramas from an input narrow FOV image. Accordingly, in some embodiments, the guided co-modulated GAN is trained using FOV masks 602. Although six example FOV masks are shown at 602, this is intended to be exemplary, and not limiting, as a variety of FOV masks may be used during training. As discussed above, full panoramas are used during training. These full panoramas are combined with FOV masks 602 to create the partial panoramas described above. These resemble the warped narrow FOV images that are obtained at test time, providing a more accurate training set for the network.

Figure 7:
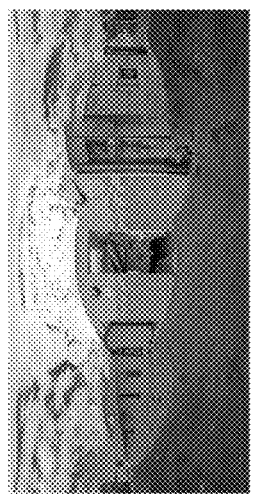
FIG. 7 illustrates example panorama extrapolations in accordance with one or more embodiments.
Figure 7:
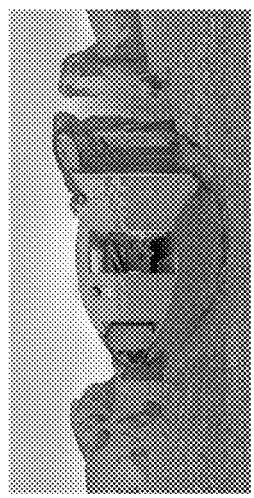
Figure 7:
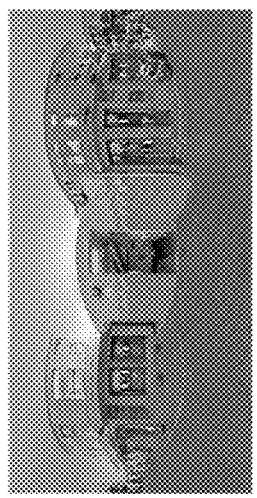
Figure 7:
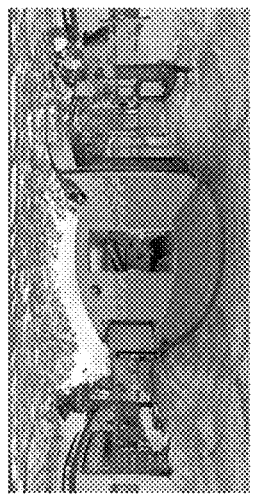
Figure 7:
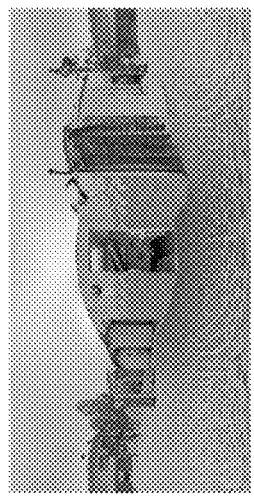
Figure 7:
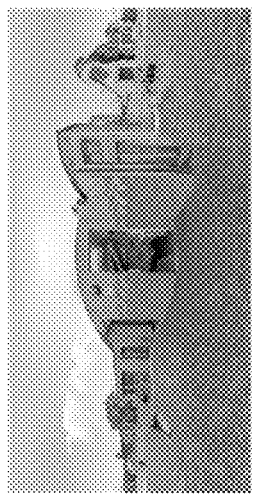
Figure 7:
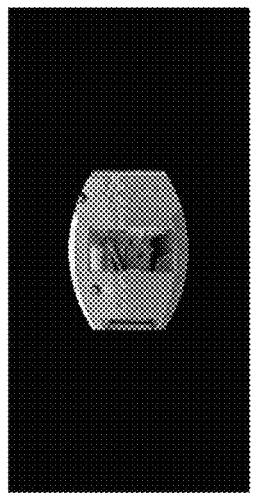
Figure 7:
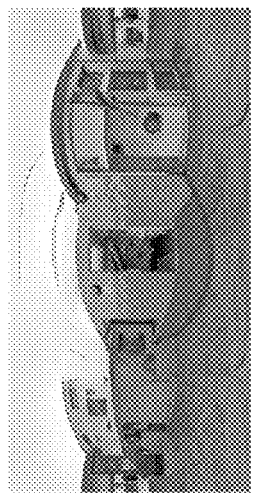
Figure 7:
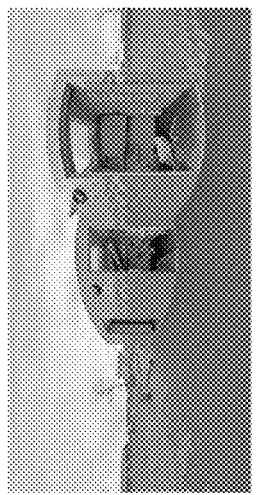

FIG. 7 illustrates example panorama extrapolations in accordance with one or more embodiments. As shown in FIG. 7, the user-provided guide leads to different generated panoramas based on the guide. For example, the input image remains the same in each extrapolated panorama (corresponding to the center of each image). However, the extrapolated portions of the panorama vary, depending on the selected guide. This results in more controllable panorama generation as compared to previous techniques.

Figure 8:
FIGS. 8-10 illustrate an example panorama extrapolation and virtual object insertion in accordance with one or more embodiments.
Figure 9:
Figure 10:
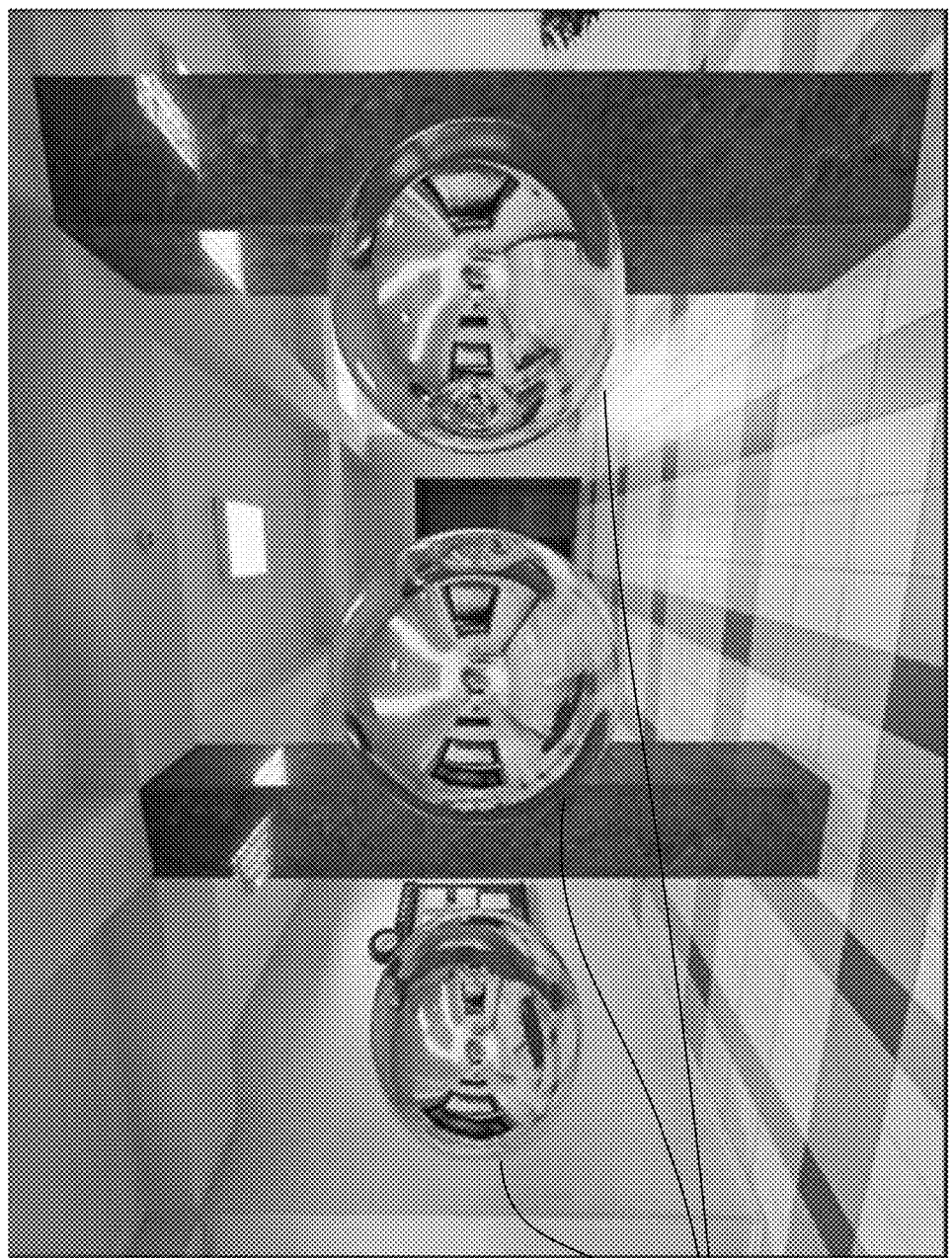

FIGS. 8-10 illustrate an example panorama extrapolation and virtual object insertion in accordance with one or more embodiments. FIG. 8 shows an example of an input image 800. Although FIG. 8 illustrates an example of an image of an interior scene, embodiments can be used on images representing exterior and/or interior scenes. As discussed, the input image is then used, along with a guide, to create an extrapolated panorama image, an example of which is shown in FIG. 9. As shown in the example of FIG. 9, the extrapolated panorama image 900 now includes a full 360-degree view of the interior scene, with additional details generated for the hallway, windows on the walls, etc. Once completed, the extrapolated panorama can be used in a variety of ways. For example, the panorama can be added to a panorama viewer which enables a user to look in any direction and see a different portion of the scene (such as in a virtual or augmented reality environment).

Additionally, in the example of FIG. 10, virtual objects can be inserted into the scene. As discussed, shiny objects present a particular challenge when inserted because there is no environmental data for them to reflect, making them appear unrealistic and/or visually confusing. However, as shown in the example of FIG. 10, because a complete panorama has been generated, inserted which reflect the appropriate content from the extrapolated panorama, making the presence of the objects more realistic. For example, in augmented image 1000, three new objects 1002 have been added. The mirrored spheres reflect the light from the environment, making areas outside the FOV of the original image visible. Because that area has been generated (e.g., in extrapolated panorama 900), the extrapolated panorama data can be used to render the reflection shown in the spheres. This makes the insertion of the spheres more realistic/visually pleasing as they appear to plausibly exist within the space represented by the image.

Figure 11:
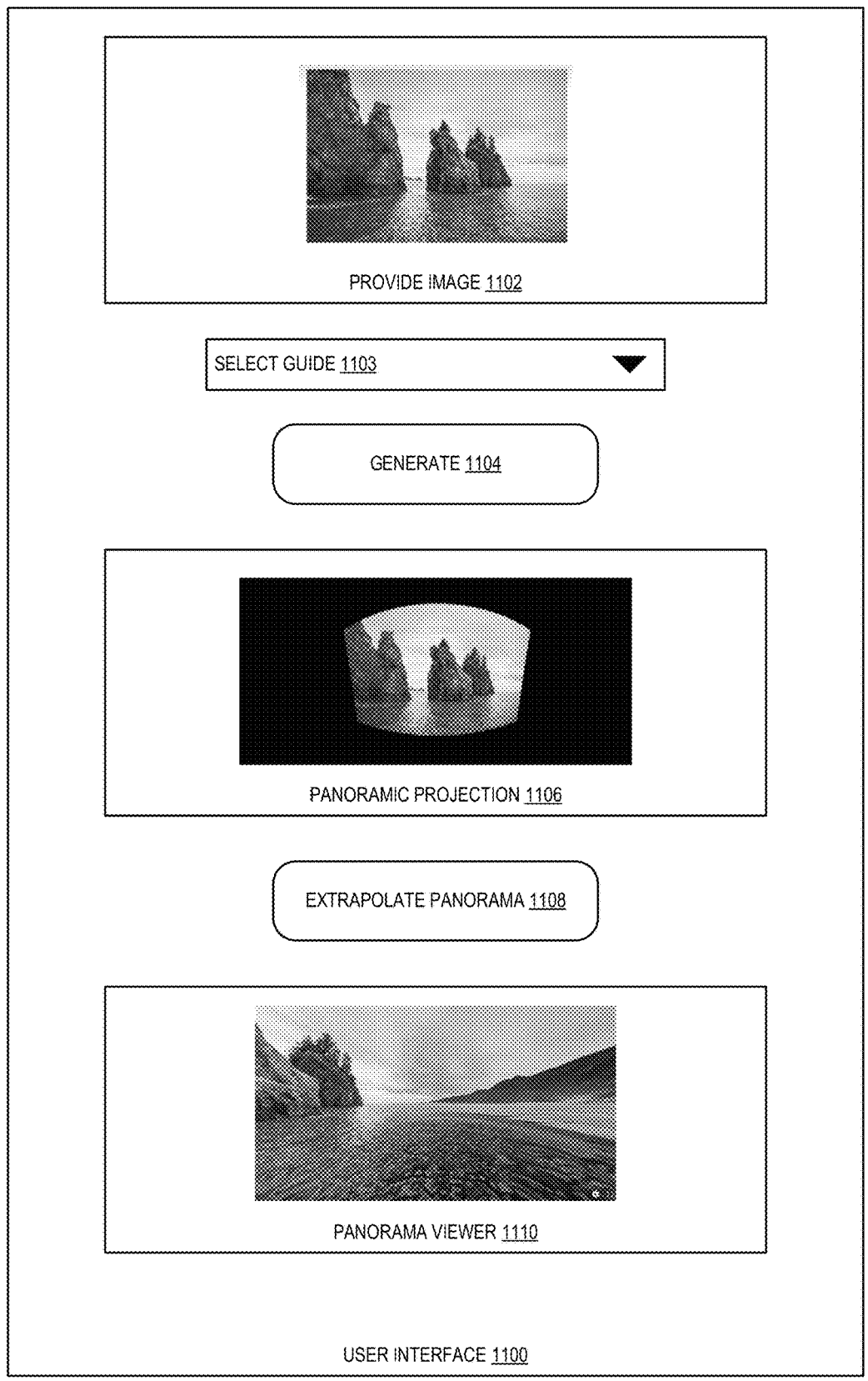
FIG. 11 illustrates an example of a user interface in accordance with one or more embodiments.

FIG. 11 illustrates an example of a user interface in accordance with one or more embodiments. The example user interface 1100 of FIG. 11 shows one implementation of a user interface, various different user interface implementations may also be used in accordance with various embodiments. The user provides an input image 1102 via the user interface 1100. In some embodiments, the user uploads the image, downloads the image, provides a link or other identifier associated with the image stored locally or remotely, etc. The user may also optionally select a guide 1103 from a list of guides supported by the guide model. For example, the supported guides may include the classes which the guide model is trained to identify.

The user can then select a user interface element 1104 to generate the panoramic projection 1106. The panoramic projection is hen generated as discussed above. For example, the camera parameters are determined (e.g., estimated, obtained from image metadata, etc.) and used to warp the input image to create the panoramic projection. The user can edit the panoramic projection 1106 as needed (e.g., can adjust the field of view, elevation, etc.). The user can then select a user interface element 1108 to extrapolate the panorama. The panorama is then extrapolated as discussed herein. For example, using the selected guide, the panorama generator performs guided co-modulation generation to create the complete panorama. The resulting panorama is then presented in a panorama viewer 1110 which enables the user to view the panorama from a variety of angles. Once satisfied, the user may download the panorama for use in other applications (e.g., object insertion, etc.).

Figure 12:
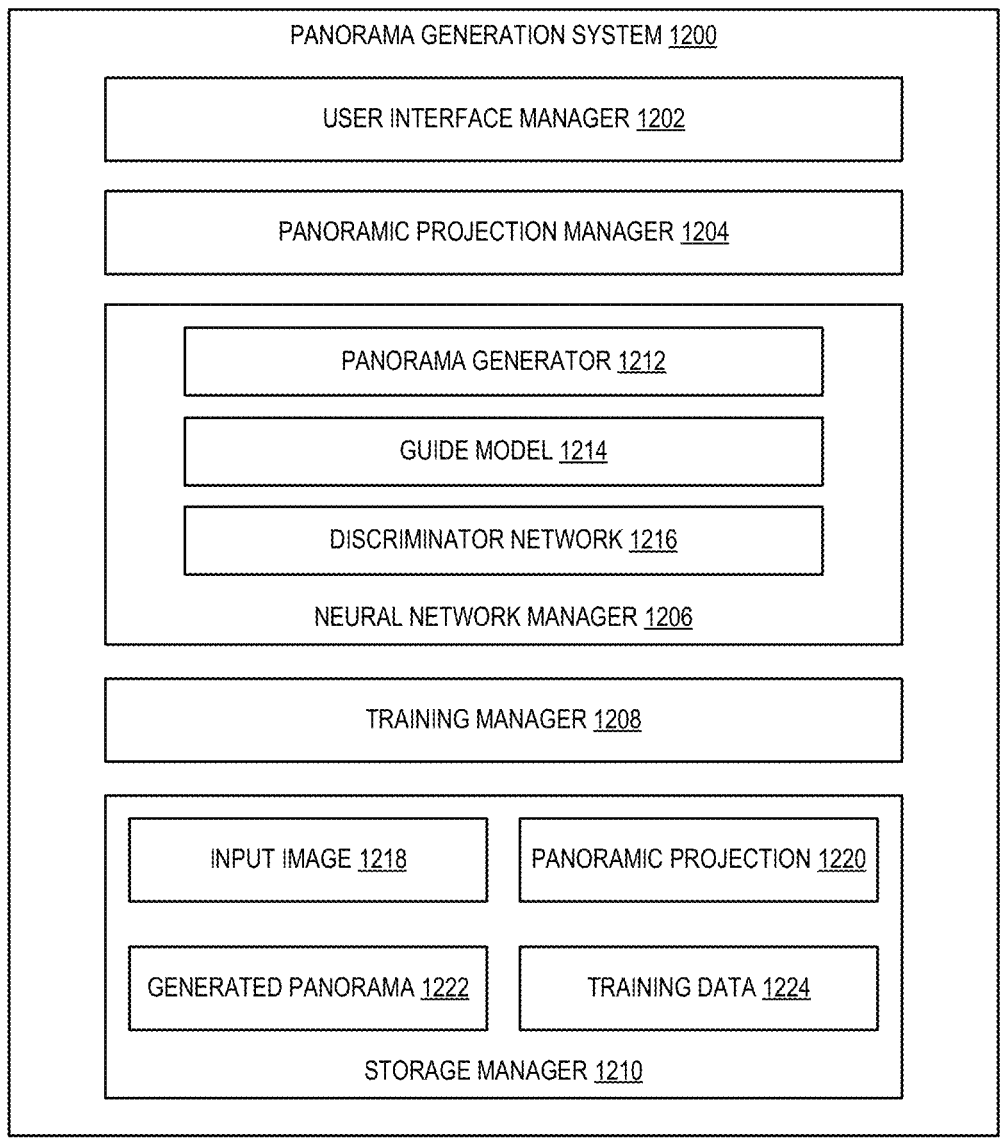
FIG. 12 illustrates a schematic diagram of panorama generation system in accordance with one or more embodiments.

FIG. 12 illustrates a schematic diagram of panorama generation system (e.g., "panorama generation" described above) in accordance with one or more embodiments. As shown, the panorama generation system 1200 may include, but is not limited to, user interface manager 1202, panorama projection manager 1204, neural network manager 1206, training manager 1208, and storage manager 1210. The neural network manager 1204 includes a panorama generator 1212, a guide model 1214, and a discriminator network 1216. The storage manager 1210 includes input image data 1218, panoramic projection data 1220, generated panoramas 1222, and training data 1224.

As illustrated in FIG. 12, the panorama generation system 1200 includes a user interface manager 1202. For example, the user interface manager 1202 allows users to provide input image data to the panorama generation system 1200. In some embodiments, the user interface manager 1202 provides a user interface through which the user can upload the input images 1218 for which a panorama is to be generated, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the panorama generation system 1200.

Additionally, the user interface manager 1202 allows users to request the panorama generation system 1200 to generate an extrapolated panorama for the input image and select a guide for the panorama generation. In some embodiments, the user interface manager 1202 enables the user to view the resulting generated panorama and/or perform other actions on the panorama (e.g., object insertion, etc.).

As illustrated in FIG. 12, the panorama generation system 1200 also includes a panoramic projection manager 1204. As discussed, the panoramic projection manager can receive the input image 1218 and determine camera parameters associated with the image. In some embodiments, this may include estimating camera parameters using a camera parameters estimation model. Alternatively, the camera parameters may be known (e.g., the image is from a camera with known parameters, the camera parameters are associated with the image as metadata, etc.). Using the camera parameters, the panorama projection manager 1204 warps the input image to create panoramic projection 1220.

As illustrated in FIG. 12, the panorama generation system 1200 also includes a neural network manager 1206. Neural network manager 1208 may host a plurality of neural networks or other machine learning models, such as panorama generator 1212, guide model 1214, discriminator network 1216, etc. The neural network manager 1206 may include an execution environment, libraries, and/or any other data needed to execute the machine learning models. In some embodiments, the neural network manager 1206 may be associated with dedicated software and/or hardware resources to execute the machine learning models. As discussed, the panorama generator 1212 may include a guided co-modulation generator which receives the panoramic projection 1220 and a guide value and generates generated panorama 1222.

The neural network manager 1206 may also include guide model 1214 which may be a pretrained classifier, as discussed above. In some embodiments, the neural network manager 1206 may also host discriminator 1216 which is used to train the panorama generator 1212. Although depicted in FIG. 12 as being hosted by a single neural network manager 1206, in various embodiments the neural networks may be hosted in multiple neural network managers and/or as part of different components. For example, each model 1212-1216 can be hosted by their own neural network manager, or other host environment, in which the respective neural networks execute, or the models may be spread across multiple neural network managers depending on, e.g., the resource requirements of each model, etc.

As illustrated in FIG. 12 the panorama generation system 1200 also includes training manager 1210. The training manager 1210 can teach, guide, tune, and/or train one or more neural networks. In particular, the training manager 1210 can train a neural network based on a plurality of training data 1224. For example, the panorama generator 1212 may be trained to generate a panorama from an input narrow FOV image. Additionally, the GANs may be further optimized using loss functions, as discussed above, by backpropagating gradient descents. More specifically, the training manager 1210 can access, identify, generate, create, and/or determine training input and utilize the training input to train and fine-tune a neural network. For instance, the training manager 1210 can train the panorama generator 1212 using discriminator network 1216, end-to-end, as discussed above.

As illustrated in FIG. 12, the panorama generation system 1200 also includes the storage manager 1210. The storage manager 1210 maintains data for the panorama generation system 1200. The storage manager 1210 can maintain data of any type, size, or kind as necessary to perform the functions of the panorama generation system 1200. As shown in FIG. 12, the storage manager 1210 includes input image data 1218. Input image data 1218 can include data for any digital image utilized by the panorama generation system 1200. For example, input image data 1218 includes a narrow FOV digital image of a scene provided by a user, where the user wants to have a full 360-degree panorama generated from the image. In this context, a narrow FOV image can include any image with a field of view less than a full 360 degrees.

The storage manager 1210 may also include panoramic projection data 1220. The panoramic projection data 1220 may include a warped input image that has been warped according to camera parameters associated with the input image. The panoramic projection data 1220 reflects the portion of the complete 360-degree FOV represented by the input image. In some embodiments, the panoramic projection data 1220 is stored by the storage manager during processing or to be used to generate additional panorama options at a later time. In some embodiments, the panoramic projection data 1220 is maintained in memory during processing.

The storage manager 1210 may further include generated panorama data 1222. The generated panorama data 1222 includes the complete 360-degree panoramas produced by the panorama generator 1212 for a given input image. The storage manager 1210 may further include training data 1224. The training data 1224 may full panorama images obtained from an image repository or other source which can be used by training manager 1208 to train the panorama generator. In some embodiments, the training data 1224 can also include FOV masks which can be combined with the full panoramas to create partial panoramas for use during training, as discussed above.

Each of the components 1202-1210 of the panorama generation system 1200 and their corresponding elements (as shown in FIG. 12) may be in communication with one another using any suitable communication technologies. It will be recognized that although components 1202-1210 and their corresponding elements are shown to be separate in FIG. 12, any of components 1202-1210 and their corresponding elements may be combined into fewer components, such as into a single facility or module, divided into more components, or configured into different components as may serve a particular embodiment.

The components 1202-1210 and their corresponding elements can comprise software, hardware, or both. For example, the components 1202-1210 and their corresponding elements can comprise one or more instructions stored on a computer-readable storage medium and executable by processors of one or more computing devices. When executed by the one or more processors, the computer-executable instructions of the panorama generation system 1200 can cause a client device and/or a server device to perform the methods described herein. Alternatively, the components 1202-1210 and their corresponding elements can comprise hardware, such as a special purpose processing device to perform a certain function or group of functions. Additionally, the components 1202-1210 and their corresponding elements can comprise a combination of computer-executable instructions and hardware.

Furthermore, the components 1202-1210 of the panorama generation system 1200 may, for example, be implemented as one or more stand-alone applications, as one or more modules of an application, as one or more plug-ins, as one or more library functions or functions that may be called by other applications, and/or as a cloud-computing model. Thus, the components 1202-1210 of the panorama generation system 1200 may be implemented as a stand-alone application, such as a desktop or mobile application. Furthermore, the components 1202-1210 of the panorama generation system 1200 may be implemented as one or more web-based applications hosted on a remote server. Alternatively, or additionally, the components of the panorama generation system 1200 may be implemented in a suite of mobile device applications or "apps."

As shown, the panorama generation system 1200 can be implemented as a single system. In other embodiments, the panorama generation system 1200 can be implemented in whole, or in part, across multiple systems. For example, one or more functions of the panorama generation system 1200 can be performed by one or more servers, and one or more functions of the panorama generation system 1200 can be performed by one or more client devices. The one or more servers and/or one or more client devices may generate, store, receive, and transmit any type of data used by the panorama generation system 1200, as described herein.

In one implementation, the one or more client devices can include or implement at least a portion of the panorama generation system 1200. In other implementations, the one or more servers can include or implement at least a portion of the panorama generation system 1200. For instance, the panorama generation system 1200 can include an application running on the one or more servers or a portion of the panorama generation system 1200 can be downloaded from the one or more servers. Additionally or alternatively, the panorama generation system 1200 can include a web hosting application that allows the client device(s) to interact with content hosted at the one or more server(s).

For example, upon a client device accessing a webpage or other web application hosted at the one or more servers, in one or more embodiments, the one or more servers can receive access to one or more digital images (e.g., the input image data 1218, such as camera roll or an individual's personal photos) stored on the client device or at another storage location. Moreover, the client device can receive a request (i.e., via user input) to generate a panorama for an input image and provide the request to the one or more servers. Upon receiving the request, the one or more servers can automatically perform the methods and processes described above to generate a full 360-degree panorama. The one or more servers can return the full panorama to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 14. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks M08 will be discussed in more detail below with regard to FIG. 14.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 14.

Figure 13:
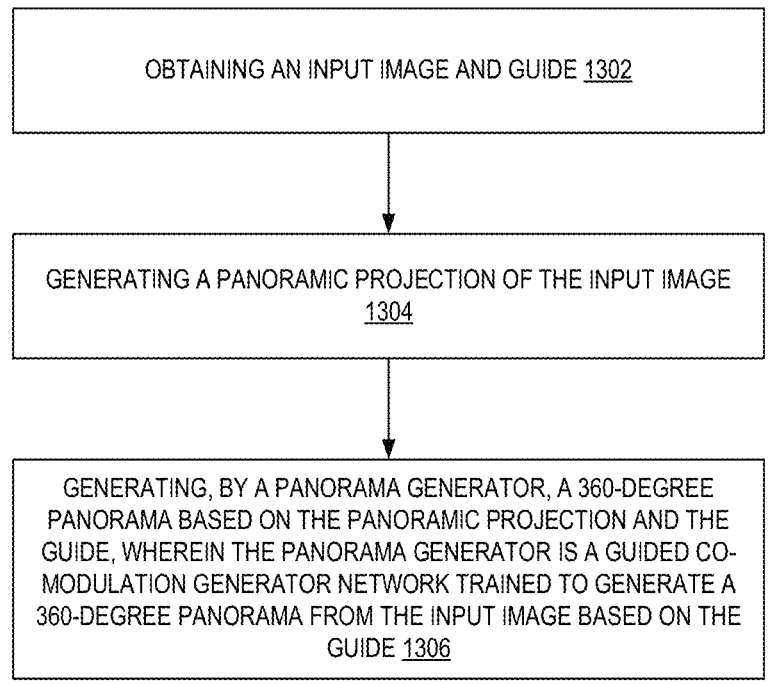
FIG. 13 illustrates a flowchart of a series of acts in a method of extracting 360-degree panoramas from narrow field of view images in accordance with one or more embodiments.

FIGS. 1-12, the corresponding text, and the examples, provide a number of different systems and devices that enables panorama extrapolation. In addition to the foregoing, embodiments can also be described in terms of flowcharts comprising acts and steps in a method for accomplishing a particular result. For example, FIG. 13 illustrates a flowchart of an exemplary method in accordance with one or more embodiments. The method described in relation to FIG. 13 may be performed with fewer or more steps/acts or the steps/acts may be performed in differing orders. Additionally, the steps/acts described herein may be repeated or performed in parallel with one another or in parallel with different instances of the same or similar steps/acts.

FIG. 13 illustrates a flowchart 1300 of a series of acts in a method of extracting 360-degree panoramas from narrow field of view images in accordance with one or more embodiments. In one or more embodiments, the method 1300 is performed in a digital medium environment that includes the panorama generation system 100. The method 1300 is intended to be illustrative of one or more methods in accordance with the present disclosure and is not intended to limit potential embodiments. Alternative embodiments can include additional, fewer, or different steps than those articulated in FIG. 13.

As illustrated in FIG. 13, the method 1300 includes an act 1302 of obtaining an input image and guide. For example, the user can upload an image, download an image, provide a reference to the image (e.g., a URL, URI, etc.). As discussed, the input image is a narrow field of view digital image. For example, a narrow FOV image may include an image with a field of view less than a full 360 degrees. In some embodiments, a user interface may be provided through which the user can specify a guide. For example, a menu, list, or other graphic element may be provided which enables the user to select a guide from a list of supported guides. As discussed, in some embodiments, the guide is a class that a guide model has been trained to identify.

As illustrated in FIG. 13, the method 1300 includes an act 1304 of generating a panoramic projection of the input image. In some embodiments, generating the panoramic projection includes determining camera parameters associated with the input image and generating the panoramic projection using the camera parameters. In some embodiments, the panoramic projection is generated by warping the input image based on the camera parameters.

As illustrated in FIG. 13, the method 1300 includes an act 1306 of generating, by a panorama generator, a 360-degree panorama based on the panoramic projection and the guide, wherein the panorama generator is a guided co-modulation generator network trained to generate a 360-degree panorama from the input image based on the guide. In some embodiments, generating the 360-degree panorama further includes determining a guide vector based on the input image using a pre-trained guide model and generating the 360-degree panorama using guided co-modulation based on the guide vector and the panoramic projection. In some embodiments, generating the 360-degree panorama further includes receiving a guide target, determining a guide vector based on the input image using a pre-trained guide model, determining a target vector based on a difference between the guide target and the guide vector, and generating the 360-degree panorama using guided co-modulation based on the target vector and the panoramic projection.

In some embodiments, the panorama generator is trained by obtaining training panorama images, creating partial panorama images by applying field of view masks to the training panorama images, generating, by an untrained panorama generator network, generated panoramas based on the partial panorama images, evaluating the generated panoramas by a discriminator network using the training panorama images, and training the untrained panorama generator network and the discriminator network based on the evaluation. In some embodiments, evaluating the generated panoramas by a discriminator network using the training panorama images, further includes applying a horizontal shift to the generated panoramas to create shifted generated panoramas and evaluating the shifted generated panoramas by a discriminator network using the training panorama images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
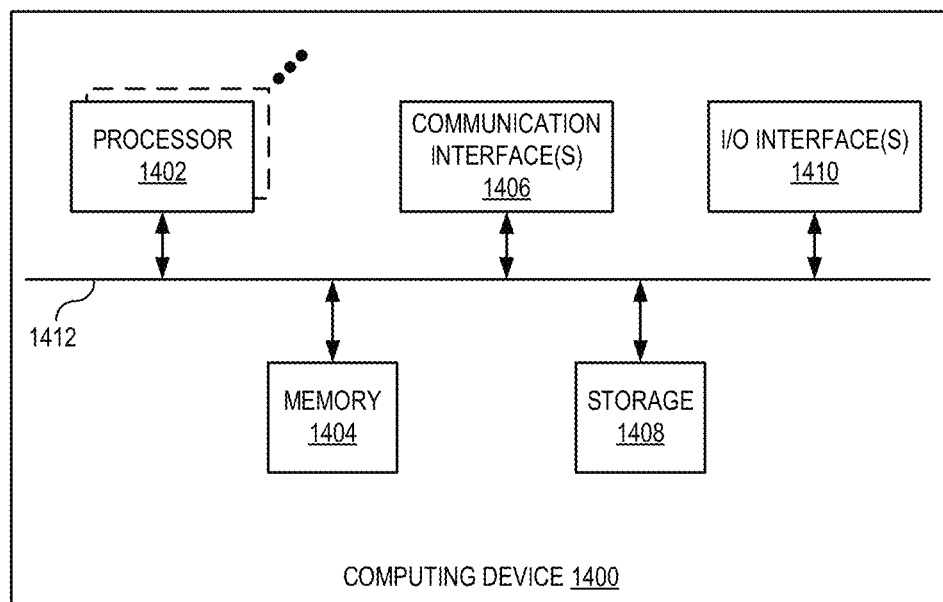
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the panorama generation system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    obtaining an input image and guide;
    generating a panoramic projection of the input image; and
    generating, by a panorama generator, a 360-degree panorama based on the panoramic projection and the guide, wherein the panorama generator is a guided co-modulation generator network trained to generate a 360-degree panorama using guided co-modulation based on a target vector and the panoramic projection, wherein the target vector is determined based on a difference between a guide target and a guide vector, and wherein the guide vector is determined based on the input image using a pre-trained guide model.

2. The method of claim 1, wherein generating a panoramic projection of the input image, further comprises:
    determining camera parameters associated with the input image; and
    generating the panoramic projection using the camera parameters.

3. The method of claim 1, wherein generating a panoramic projection of the input image, further comprises:
  obtaining camera parameters associated with the input image; and
  warping the input image based on the camera parameters.

4. The method of claim 1, wherein generating, by a panorama generator, a 360-degree panorama based on the panoramic projection and the guide, wherein the panorama generator is a guided co-modulation generator network trained to generate a 360-degree panorama from the input image based on the guide, further comprises:
  determining a guide vector based on the input image using a pre-trained guide model; and
  generating the 360-degree panorama using guided co-modulation based on the guide vector and the panoramic projection.

5. The method of claim 1, wherein the guide is a class that a guide model has been trained to identify.

6. The method of claim 1, wherein the input image is a narrow field of view digital image.

7. The method of claim 1, wherein the panorama generator is trained by:
  obtaining training panorama images;
  creating partial panorama images by applying field of view masks to the training panorama images;
  generating, by an untrained panorama generator network, generated panoramas based on the partial panorama images;
  evaluating the generated panoramas by a discriminator network using the training panorama images; and
  training the untrained panorama generator network and the discriminator network based on the evaluation.

8. The method of claim 7, wherein evaluating the generated panoramas by a discriminator network using the training panorama images, further comprises:
  applying a horizontal shift to the generated panoramas to create shifted generated panoramas; and
  evaluating the shifted generated panoramas by a discriminator network using the training panorama images.

9. A non-transitory computer-readable medium storing executable instructions, which when executed by a processing device, cause the processing device to perform operations comprising:
  obtaining an input image and guide;
  generating a panoramic projection of the input image; and
  generating, by a panorama generator, a 360-degree panorama based on the panoramic projection and the guide, wherein the panorama generator is a guided co-modulation generator network trained to generate a 360-degree panorama using guided co-modulation based on a target vector and the panoramic projection, wherein the target vector is determined based on a difference between a guide target and a guide vector, and wherein the guide vector is determined based on the input image using a pre-trained guide model.

10. The non-transitory computer-readable medium of claim 9, wherein the operation of generating a panoramic projection of the input image, further comprises:
  determining camera parameters associated with the input image; and
  generating the panoramic projection using the camera parameters.

11. The non-transitory computer-readable medium of claim 9, wherein the operation of generating a panoramic projection of the input image, further comprises:
  obtaining camera parameters associated with the input image; and
  warping the input image based on the camera parameters.

12. The non-transitory computer-readable medium of claim 9, wherein the operation of generating, by a panorama generator, a 360-degree panorama based on the panoramic projection and the guide, wherein the panorama generator is a guided co-modulation generator network trained to generate a 360-degree panorama from the input image based on the guide, further comprises:
  determining a guide vector based on the input image using a pre-trained guide model; and
  generating the 360-degree panorama using guided co-modulation based on the guide vector and the panoramic projection.

13. The non-transitory computer-readable medium of claim 9, wherein the guide is a class that a guide model has been trained to identify.

14. The non-transitory computer-readable medium of claim 9, wherein the input image is a narrow field of view digital image.

15. The non-transitory computer-readable medium of claim 9, wherein the panorama generator is trained by:
  obtaining training panorama images;
  creating partial panorama images by applying field of view masks to the training panorama images;
  generating, by an untrained panorama generator network, generated panoramas based on the partial panorama images;
  evaluating the generated panoramas by a discriminator network using the training panorama images; and
  training the untrained panorama generator network and the discriminator network based on the evaluation.

16. The non-transitory computer-readable medium of claim 15, wherein evaluating the generated panoramas by a discriminator network using the training panorama images, further comprises:
  applying a horizontal shift to the generated panoramas to create shifted generated panoramas; and
  evaluating the shifted generated panoramas by a discriminator network using the training panorama images.

17. A system comprising:
  a memory component; and
  a processing device coupled to the memory component, the processing device to perform operations comprising:
    obtaining an input image and guide;
    generating a panoramic projection of the input image; and
    generating, by a panorama generator, a 360-degree panorama based on the panoramic projection and the guide, wherein the panorama generator is a guided co-modulation generator network trained to generate a 360-degree panorama using guided co-modulation based on a target vector and the panoramic projection, wherein the target vector is determined based on a difference between a guide target and a guide vector and wherein the guide vector is determined based on the input image using a pre-trained guide model.

18. The system of claim 17, wherein the operation of generating a panoramic projection of the input image, further comprises:
  determining camera parameters associated with the input image; and
  generating the panoramic projection using the camera parameters.

* * * * *